(12) United States Patent
Abou Daya (10) Patent No.: US 11,790,360 B1
(45) Date of Patent: Oct. 17, 2023

(54) MULTI-ACTOR TRANSACTION SIMULATION IN A BLOCKCHAIN NETWORK

(71) Applicant: GEARLAY TECHNOLOGIES INC., Vancouver (CA)

(72) Inventor: Abbas Abou Daya, Vancouver (CA)

(73) Assignee: GEARLAY TECHNOLOGIES INC., Vancouver (CA)

( * ) Notice: Subject to any disclaimer, the term of this patent is extended or adjusted under 35 U.S.C. 154(b) by 0 days.

(21) Appl. No.: 18/183,776

(22) Filed: Mar. 14, 2023

(51) Int. Cl.
  *G06Q 20/38* (2012.01)
  *G06Q 20/36* (2012.01)
(52) U.S. Cl.
  CPC ......... *G06Q 20/389* (2013.01); *G06Q 20/367* (2013.01); *G06Q 2220/00* (2013.01)
(58) Field of Classification Search
  None
  See application file for complete search history.

(56) References Cited

U.S. PATENT DOCUMENTS

| | | | |
|---|---|---|---|
| 11,080,689 B1* | 8/2021 | Remeika, Jr. | G06Q 20/02 |
| 2020/0027089 A1* | 1/2020 | Kuchar | G06Q 20/4016 |
| 2020/0143395 A1* | 5/2020 | Liu | G06N 20/00 |
| 2020/0311790 A1* | 10/2020 | Keren | G06Q 20/4016 |
| 2021/0192526 A1* | 6/2021 | Kuchar | G06Q 20/065 |
| 2022/0245626 A1* | 8/2022 | Sewell | G06Q 20/3829 |
| 2022/0300904 A1* | 9/2022 | Gaur | G06Q 20/0655 |
| 2022/0318399 A1* | 10/2022 | Rodler | G06Q 20/389 |
| 2022/0327529 A1* | 10/2022 | Williams | G06Q 20/065 |

(Continued)

FOREIGN PATENT DOCUMENTS

| | | | | |
|---|---|---|---|---|
| CN | 108536445 A | * | 9/2018 | G06F 8/43 |
| CN | 109658245 A | * | 4/2019 | G06N 3/08 |
| CN | 114491508 A | * | 5/2022 | |

OTHER PUBLICATIONS

Z. Tian, "Smart Contract Defect Detection Based on Parallel Symbolic Execution," 2019 3rd International Conference on Circuits, System and Simulation (ICCSS), Nanjing, China, 2019, pp. 127-132, doi: 10.1109/CIRSYSSIM.2019.8935603. (Year: 2019).*

(Continued)

*Primary Examiner* — Jacob C. Coppola
*Assistant Examiner* — Eduardo Castilho
(74) *Attorney, Agent, or Firm* — Jenna L. Wilson; Wilson Lue LLP (57) ABSTRACT

A simulation method implemented at least in part at a node of a blockchain network enables detection of suspected malicious behaviour. When a purchase of a token of interest by a user is detected, information about other queued transactions awaiting committal to the blockchain is retrieved, and a batch of probing transactions is constructed using the information about the queued transactions. The batch includes a probing transaction representing a sale of the token by the user. At the node, the state of the blockchain is overridden so that the user's wallet and other wallets appear to contain bytecode executable to aggregate multiple transactions into a single call, and the batch of transactions is thus executed in a single call. The results are evaluated to determine whether the sale of the token by the user was successful. If the evaluation is not successful, remedial action may be taken.

24 Claims, 5 Drawing Sheets

(56) References Cited

U.S. PATENT DOCUMENTS

| | | | |
|---|---|---|---|
| 2023/0169593 A1* | 6/2023 | Wong | G06Q 20/36 705/37 |
| 2023/0173395 A1* | 6/2023 | Cella | G06Q 20/389 463/25 |

OTHER PUBLICATIONS

W. Chen, Z. Zheng, E. C. .—H. Ngai, P. Zheng and Y. Zhou, "Exploiting Blockchain Data to Detect Smart Ponzi Schemes on Ethereum," in IEEE Access, vol. 7, pp. 37575-37586, 2019, doi: 10.1109/ACCESS.2019.2905769. (Year: 2019).*

E. Jung, M. Le Tilly, A. Gehani and Y. Ge, "Data Mining-Based Ethereum Fraud Detection," 2019 IEEE International Conference on Blockchain (Blockchain), Atlanta, GA, USA, 2019, pp. 266-273, doi: 10.1109/Blockchain.2019.00042. (Year: 2019).*

P. Zheng, Z. Zheng, J. Wu and H.—N. Dai, "XBlock-ETH: Extracting and Exploring Blockchain Data From Ethereum," in IEEE Open Journal of the Computer Society, vol. 1, pp. 95-106, 2020, doi: 10.1109/OJCS.2020.2990458. (Year: 2020).*

"Xia et al. ""Trade or Trick? Detecting and Characterizing Scam Tokens on Uniswap Decentralized Exchange,""", 2021, retrieved from https://arxiv.org/abs/2109.00229 arXiv:2109.00229 [cs.CR]" (Year: 2021).*

Meisl, "Understanding Ethereum Transaction Simulation—And Why It Matters,", 2022, retrieved from https://web.archive.org/web/20221208090107/https://www.blocknative.com/blog/what-is-simulation (Year: 2022).*

M. Cao, Y. Zhang, Z. Feng, J. Hu and Y. Zhu, "TokenAuditor: Detecting Manipulation Risk in Token Smart Contract by Fuzzing," 2022 IEEE 22nd International Conference on Software Quality, Reliability and Security (QRS), Guangzhou, China, 2022, pp. 651-662, doi: 10.1109/QRS57517.2022.00071. (Year: 2022).*

Huang "Deep smart Contract Intent detection,", 2022, retrieved from https://arxiv.org/abs/2211.10724. arXiv:2211.10724 [cs.SE] (Year: 2022).*

BowTiedDevil, "Avoiding Trap Tokens With eth_call,", 2022, retrieved from https://web.archive.org/web/20220901225822/https://degencode.substack.com/p/avoiding-trap-tokens-with-eth_call on Sep. 1, 2022 (Year: 2022).*

Ethereum Foundation "eth Namespace,", 2022, retrieved from https://web.archive.org/web/20221203021411/https://geth.ethereum.org/docs/rpc/ns-eth on Dec. 3, 2022 (Year: 2022).*

H. Jin, C. Li, J. Xiao, T. Zhang, X. Dai and B. Li, "Detecting Arbitrage on Ethereum Through Feature Fusion and Positive-Unlabeled Learning," in IEEE Journal on Selected Areas in Communications, vol. 40, No. 12, pp. 3660-3671, 2022, doi: 10.1109/JSAC.2022.3213335. (Year: 2022).*

Lukic, "How to Secure Multisig Wallets With Transaction Simulations,", published Feb. 21, 2023, 2023, retrieved from https://web.archive.org/web/20230326192959/https://blog.tenderly.co/how-to-secure-multisigs-with-transaction-simulations/ (Year: 2023).*

Hughes, W., Russo, A., & Schneider, G. (May 2021). MultiCall: A Transaction-batching Interpreter for Ethereum. In Proceedings of the 3rd ACM International Symposium on Blockchain and Secure Critical Infrastructure (pp. 25-35).

Solomon, Matt. Multicall: Aggregate multiple constant function call results into one. Online Github repository. 9 pgs. Retrieved from https://github.com/mds1/multicall on Mar. 14, 2023.

Go-Ethereum (Dec. 1, 2022). eth Namespace. Webpage. 6 pgs. Retrieved from https://geth.ethereum.org/docs/interacting-with-geth/rpc/ns-eth on Mar. 14, 2023.

* cited by examiner

MULTI-ACTOR TRANSACTION SIMULATION IN A BLOCKCHAIN NETWORK

TECHNICAL FIELD

The present disclosure relates to simulation of transactions in the blockchain network.

TECHNICAL BACKGROUND

The open and unregulated nature of public blockchain platforms such as the Ethereum© platform has given rise to many decentralized finance (DeFi) applications, often involving the creation of new alternative cryptocurrencies and tokens (referred to generally here as "tokens") beyond the original Bitcoin cryptocurrency and the native cryptocurrencies of blockchain platforms (such as Ether, in the Ethereum blockchain).

Generally, new tokens are launched in a blockchain through the creation of smart contracts. Users may participate in the token through the purchase of tokens using the smart contract, often by transferring value (in the native cryptocurrency of the blockchain) to the contract. The token's smart contract tracks the availability of tokens, manages the transfer of tokens from one user to another, and tracks the balance held by each participating user.

Due to the nature of the public blockchain, however, there is little effective control over the activities of smart contract creators. Smart contracts may not fully conform to any security standards, and there is no guarantee that the motives of the smart contract creator align with the expectations of participating users. Once a user has transferred value to the smart contract, they have no further control over its use. For example, a malicious smart contract creator may transfer the value away from the smart contract, effectively rendering the tokens worthless. It is also very difficult, if not impossible in some cases, for users to seek compensation due to the relative anonymity of blockchain participants. Although smart contract code is available for public inspection, given the short time frames in which transactions are submitted and committed to the blockchain, often there is not enough time for a user to inspect the code or predict what further actions may be taken that would adversely affect the user's token holdings.

BRIEF DESCRIPTION OF THE DRAWINGS

Exemplary embodiments of the present invention will be described with reference to the accompanying figures, in which.

DETAILED DESCRIPTION

A challenge for participants in DeFi is the inherent lack of trust. While transactions, as implemented by smart contracts, are automatically enforced by the blockchain when the transaction is committed to the blockchain and the block containing the transaction is validated, it does not follow that the creator of the smart contract is trustworthy, or that the effect of execution of the smart contract will be as the user expects.

Since the value of a token may be highly volatile, when a new token is launched (e.g., when the smart contract implementing the token, which may be referred to as the "token contract", is created on the blockchain), users who wish to acquire tokens must act quickly before demand drives the value higher. The speed with which users react to new token launches, and subsequently trade in tokens, in some cases may militate against conducting due diligence before purchasing a token. It takes time for a user to review a smart contract to ensure that its possible scope of function accords with the user's expectations, or to investigate the bona fides of the smart contract owner, if their identity can even be ascertained. This review can be made more difficult through the use of proxy contracts, which permit the contract owner to effectively mutate the contract logic after the token is initially launched. Even if there was sufficient time for a smart contract to be reviewed prior to entering into a transaction, many blockchain participants lack the technical tools or ability to conduct such a review.

Malicious smart contract owners may signal their intent through queued transactions-transactions submitted to the blockchain waiting in a transaction queue to be committed and added to the blockchain. However, even if a user locates these queued transactions, it is difficult to predict the outcome of those transactions-much less quickly enough to take remedial action-because the state of the blockchain may change in the meantime as intervening transactions are committed.

These challenges give rise to the opportunity for contract owners to perpetrate scams, such as "rug pulls". In a rug pull, the contract owner invites users to invest in a new token implemented by the smart contract; once significant value has been received from investors (e.g., users paying the native blockchain cryptocurrency to acquire tokens, with the cryptocurrency value being stored in the smart contract's storage or using another contract on the blockchain), the contract owner then transfers the value away, with the result that the tokens may become effectively worthless. The smart contract may permit the contract owner to mint additional tokens, reducing their value for other token owners. The smart contract may permit the contract owner to "blacklist" a token owner, thereby preventing them from selling their tokens to others in subsequent blockchain transactions, thus reducing the token value for the blacklisted party. With the anonymity provided by public blockchains, it can be practically impossible for investors to seek redress in response to a scam that depletes the value of the token.

The speed with which blockchain transactions are committed to the blockchain can also prevent a user from taking remedial action in response to actions by others, even when those actions are not malicious. For example, the actions of a "whale" (an entity holding a large amount of a given token), can have significant impact on the token's value; a user who wishes to take remedial action to avoid a significant loss must act quickly, and preferably before others take action.

Accordingly, in the embodiments discussed herein, a system and method for simulating transactions are provided that enable the simulation of transactions submitted by multiple entities, including at least one entity other than the user, so that the results of the transactions may be evaluated before the transactions submitted by the other entities are actually committed to the blockchain. The system and method may include responsive actions based on the result of the transactions. In the case of the purchase of token by a first user, the simulated transactions may include subsequent transactions by other users retrieved from the pool of submitted transactions yet to be committed to the blockchain, and a sale of the token by the first user. These transactions are simulated at a specified node of the blockchain having an altered blockchain state, without committing the transactions to the blockchain. If the results of the simulated transactions are evaluated as a failure, a responsive action may comprise submitting a transaction by or on behalf of the first user to the blockchain to sell the token before the subsequent transactions are committed. The embodiments discussed herein, thus leverage the public nature of common blockchains, including the publicly available pool of transactions submitted by other parties, to evaluate the first user's token acquisition to determine whether a responsive action should be taken.

Figure 1:
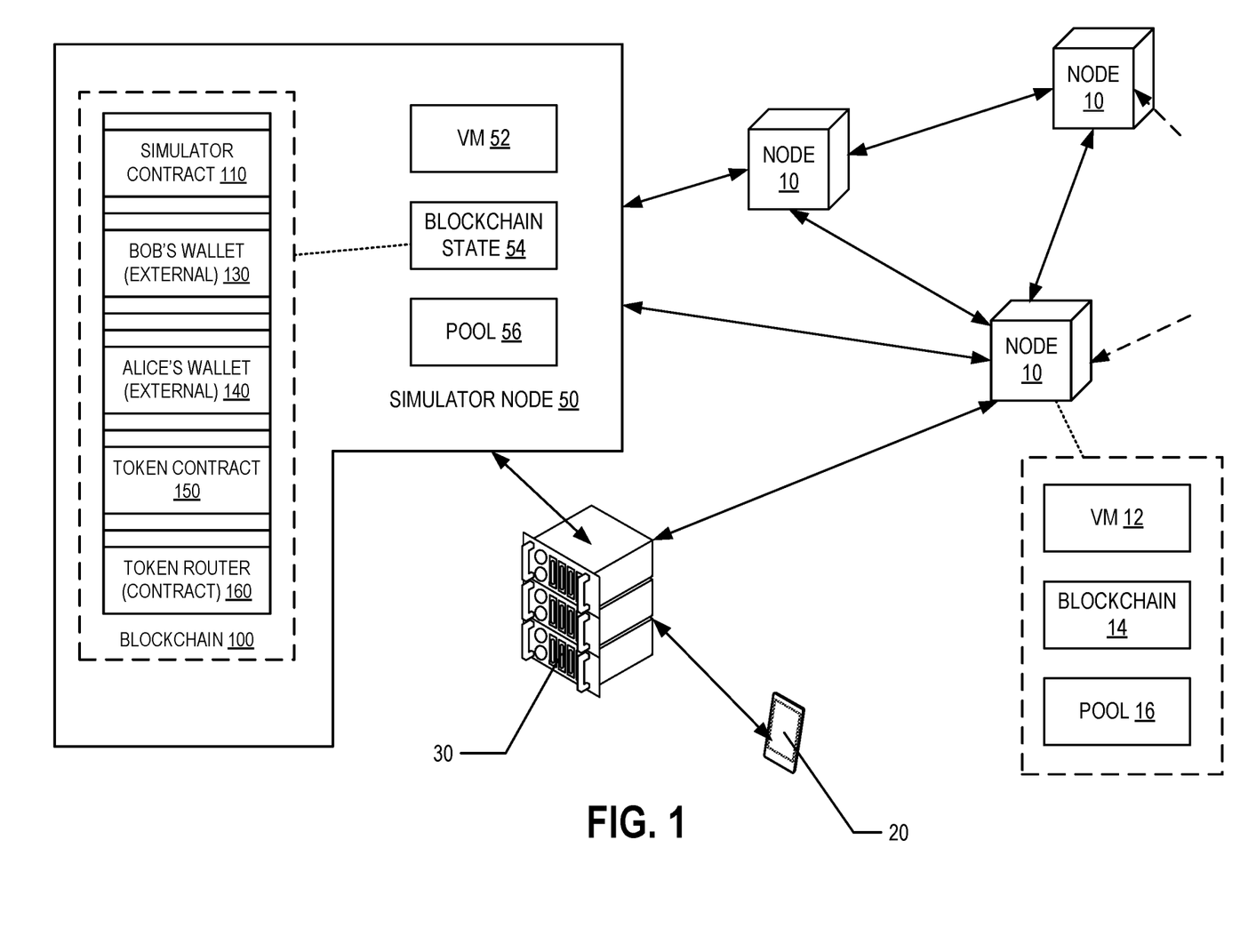
FIG. 1 is a schematic diagram illustrating an example blockchain network including a simulator node, an agent computing system, and a user computing system.

FIG. 1 is a schematic of a possible blockchain network environment in which the embodiments discussed below may be implemented. The blockchain network includes a plurality of node computing systems 10, connected over a network such as the Internet. Individual nodes 10 implement blockchain client software, including a virtual machine 12 which executes the bytecode of smart contracts stored in the blockchain 14. According to the protocol employed, the roles of nodes 10 may vary. For example, some nodes 10 may operate as "full" nodes, storing blockchain data 14, verifying blocks and blockchain states, and serving data on request. Others may be considered "lightweight" nodes, storing less blockchain data. Some nodes 10 function as "validators" or "mining" nodes, receiving submitted transactions in a transaction queue or pool 16 (often referred to as a "mempool") and processing submitted transactions by committing them in blocks to the blockchain 15 according to the protocols defined for the blockchain platform. Other nodes 10 may serve other functions in accordance with the specifications of the particular platform employed for the blockchain network. The configuration of typical blockchain nodes 10 will be known to those skilled in the art.

Additionally, the blockchain network includes a simulator node computing system 50, which also functions as a node in the blockchain network in the same manner as a node 10. The simulator node 50 also includes a virtual machine 52, pool 56, and maintains at least a partial copy of the blockchain 100 and its corresponding state 54.

In the embodiments described herein, the blockchain network is based on the Ethereum platform and token contracts are presumed to be compliant with the ERC-20 token standard for Ethereum-based tokens; thus, terminology used in this disclosure may reference Ethereum implementations, but is not intended to limit the invention to Ethereum. The embodiments discussed in this disclosure may be implemented in other blockchain environments with suitable modifications that are within the knowledge of persons skilled in the art.

Users may engage with the blockchain network using user computing devices 20. Depending on the user's activities, the computing device may also operate as a node 10, execute front-end wallet software to permit the user to engage in transactions on the blockchain, or may instead simply access another service that acts as a gateway to the blockchain network. In the embodiment illustrated in the accompanying drawings, the user engages in transactions through an agent system 30. A typical agent system 30 is a crypto bot, a computer system or service that initiates blockchain transactions on behalf of the user. Such agent systems 30 can be programmed to automatically execute trades or purchases based on rules or conditions defined by the user.

The computing systems 10, 20, 30, and 50 in FIG. 1 include hardware components, as would be understood by those skilled in the art. Thus, for example, these systems 10, 20, 30, and 50 include one or more processors, memory, network storage devices, communications systems, and other components as required to implement the embodiments discussed herein. The computing systems 10, 20, 30, and 50 may be located in various geographic locations, as mobile devices, on-premises equipment, or cloud-based systems.

Figure 2:
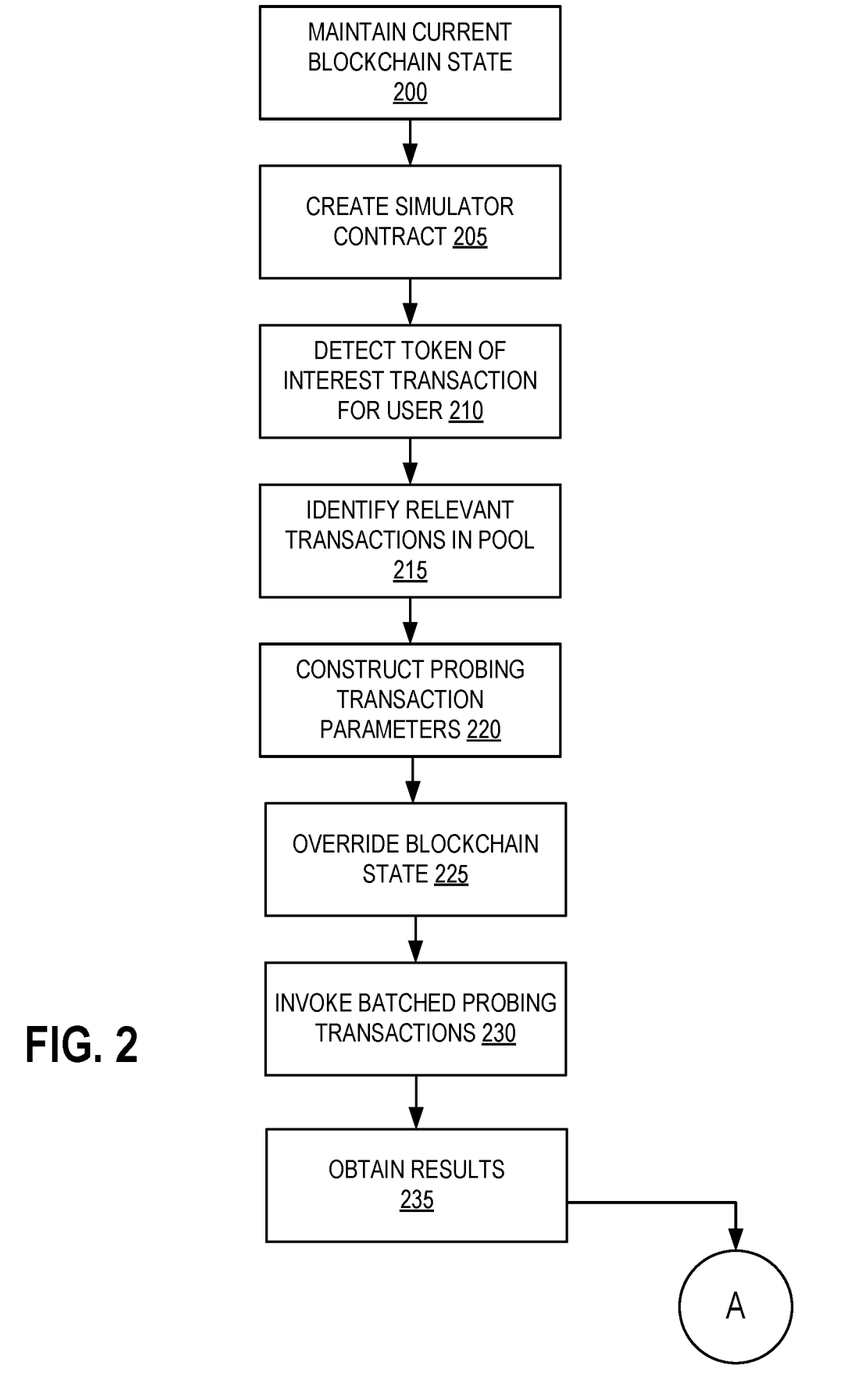
FIG. 2 is a flowchart illustrating a method for simulating transactions in the blockchain network of FIG. 1.
Figure 3:
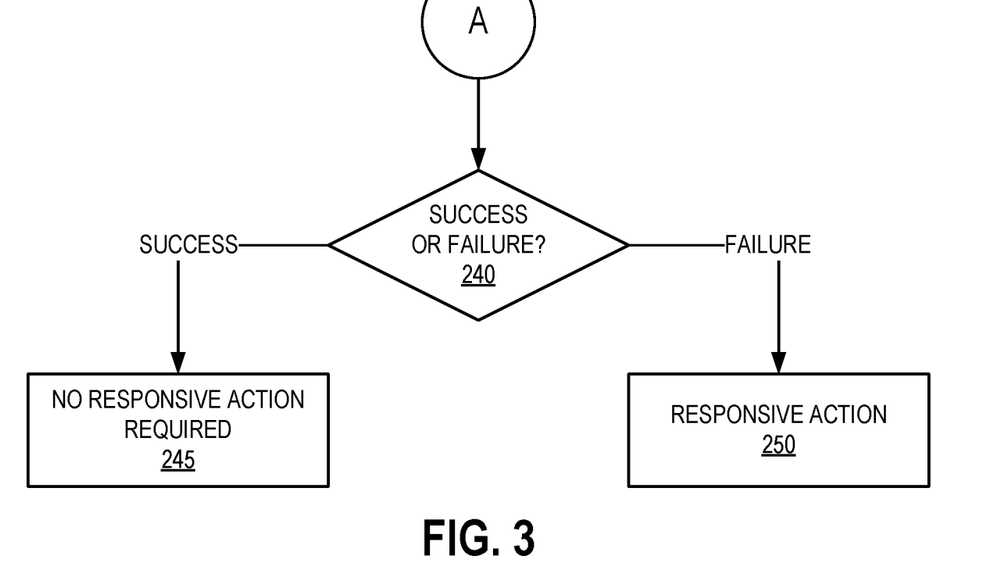
FIGS. 3 and 4 are flowcharts illustrating a method for determining whether a responsive action is to be taken after simulation of the transactions in FIG. 2.
Figure 5:
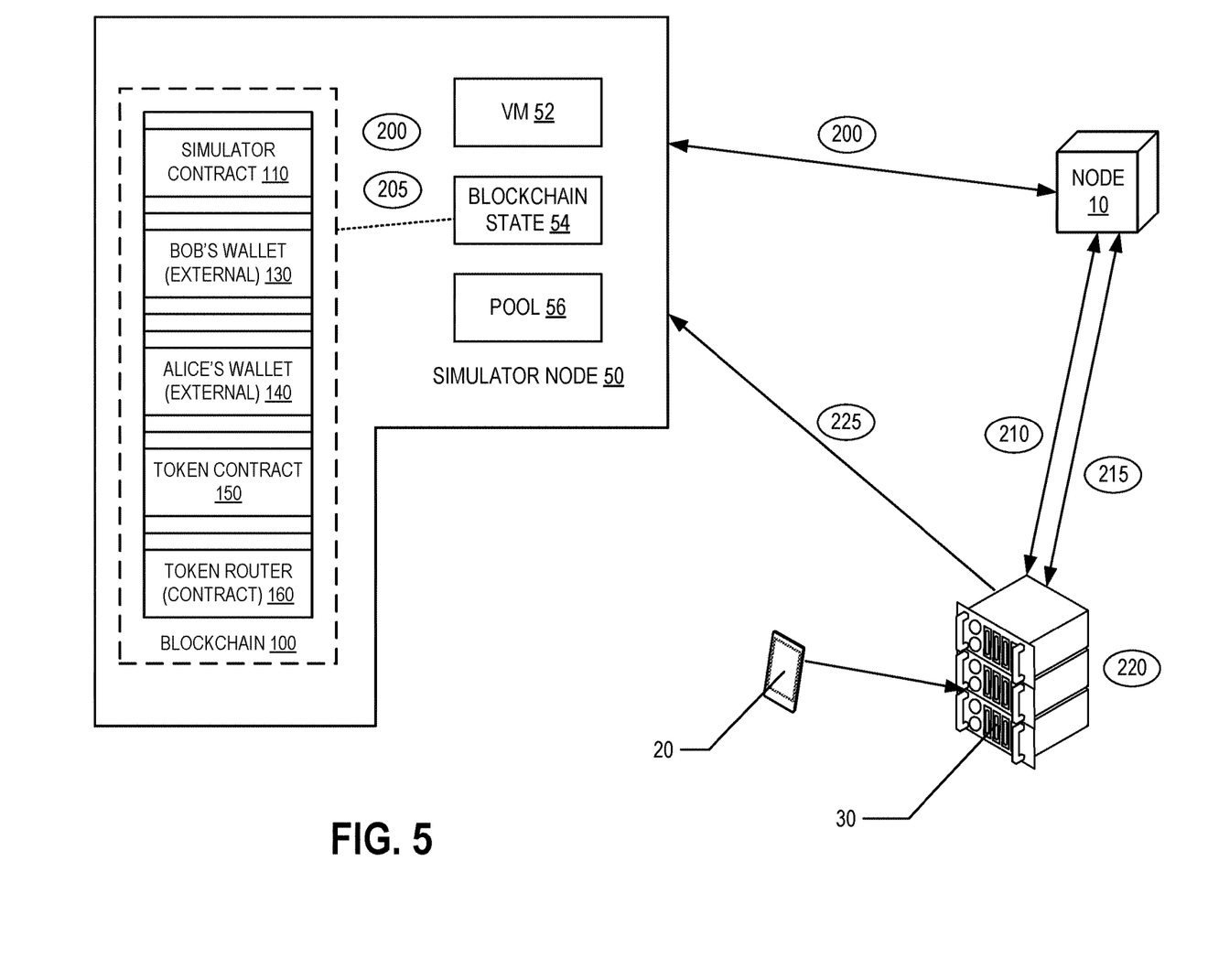
FIG. 5 is a schematic diagram illustrating initial steps of the method of FIG. 2 with the blockchain in a first state at the simulator node.

The simulation process is depicted at a high level in the flowchart of FIG. 2. Reference numerals corresponding to select steps of the method of FIGS. 2 and 3 are also included in FIGS. 5 and 6. As described above, the simulator node computing system 50 (for ease of reference, also referred to as the "simulator node") operates as a node of the blockchain network, in communication with at least one other node 10 of the network. For simplicity in the drawings, only a single node 10 is depicted as representative of other nodes 10 in the network, but it will be understood by those skill in the art that the blockchain network would likely include several nodes 10. Referring to FIGS. 2 and 5, at 200, the simulator node 50 maintains the current state 54 of the blockchain, synchronizing with the at least one other node 10 as necessary so that the blockchain 100 and state 54 maintained at the simulator node 50 is consistent data held by other nodes 10. This maintenance 200 continues throughout the simulation process.

The accompanying drawings also include a schematic depiction of the state of the blockchain 100 for ease of reference. At a preparatory stage, at 205 a simulator smart contract 110 is created. The smart contract 110 may be added to the blockchain 100 in an initial transaction in accordance with the protocols employed by the blockchain network, initiated from any suitable computing device in communication with the blockchain network. In this embodiment, the transaction adding the simulator contract originates from the simulator node computing system 50, or alternatively the agent computing system 30. Alternatively, the bytecode of the simulator smart contract 110 may not actually be committed to the blockchain 100, but instead stored off the blockchain, for instance at the simulator node 50 or at the agent computing system 30. The simulator smart contract 110 is discussed in further detail below.

The blockchain 100 in this example also includes externally owned accounts (EOAs) or wallets for at least the first user ("Alice") 140 and a second user ("Bob"), as well as other smart contracts, each corresponding to a distinct address on the blockchain 100, with addresses determined according to the blockchain's protocols. In this example, a token contract 150 maps user account addresses to token balances and a token router contract 160 handles token exchanges between users. As those skilled in the art appreciate, a principal difference between a wallet and a smart contract account is the storage of bytecode on the blockchain 100; the information about a wallet stored in the blockchain 100 includes the account address and transaction history (potentially distributed in several blocks of the blockchain), but no code, whereas the information about the smart contract account stored in the blockchain includes its bytecode. It should be noted that the existence of both a token contract 150 and token router contract 160 is not required. In practice, token router contracts are not always employed;

in some embodiments, only a token contract 150 is used. Further, while the contracts 150, 160 are depicted schematically as being located at single addresses of the blockchain 100, in some embodiments either or both of the token contract 150 and token router contract 160 (if used) may comprise proxy contracts, and thus occupy multiple addresses in the blockchain 100.

In this example embodiment, the first user associated with the first wallet 140 represents an entity, such as an individual user, who engages in a transaction to acquire a token of interest or a share in that token; the second user associated with the second wallet 130 is another user who may or may not be adverse to the first user who also proposes to engage in a transaction involving the token of interest or a share thereof. The second user may be, for example, the same entity originating the token contract 150 and router contract 160, or may be associated with that entity. However, the second user may be independent from the entity originating the token contract 150 and router contract 160.

The addition of wallets 130, 140, simulator smart contract 110 (if not simply stored off the blockchain 100) and token smart contracts 150, 160 (if used) need not occur in the same order reflected schematically in the accompanying drawings. For example, contracts may be added to the blockchain 100 in a different order than depicted, and the wallets may be generated at different times but not yet referenced in any transactions on the blockchain 100 by the time a simulation is carried out. It is expected, however, that the wallets 130, 140 and the simulator smart contract and relevant token smart contracts exist, and that the relevant token smart contracts have been committed to the blockchain 100 and thus reflected in the current blockchain state 54 at the simulator node 50, in advance of a simulation. Further, it is expected that a liquidity pool for the token exists, whether it is stored directly in the token smart contract 150 or elsewhere.

This initial state of the blockchain 100, which includes the simulator contract 110, is illustrated schematically in FIG. 5. Reference numeral 200 in FIG. 5 indicates that the simulator node 50 syncs with at least one other node 10 of the blockchain network to maintain the current state 54 of the blockchain 100 throughout the simulation process.

At 210, the blockchain network may be monitored for submitted transactions by or on behalf of the first user (the first user, Alice) to identify tokens of interest. Those skilled in the art will understand that references to a "token" also include shares or fractions of a token, unless the context requires one or the other. A token "of interest" may be a token that is subject to monitoring by the first user or by an agent (bot) for the first user. In the case where an agent system 30 is employed to conduct this monitoring, tokens of interest may have been previously explicitly identified by the first user, for example, in the first user's account settings in the agent system 30. Alternatively, the agent system 30 may monitor uncommitted blockchain transactions currently held in the pool, or recently committed transactions, by the first user to purchase new tokens; such tokens may then be identified as tokens of interest for the first user. If the first user's transaction involving the token of interest is first identified by the agent system 30 while it is uncommitted, it is expected that the transaction will be committed to the blockchain 100, and the state of the blockchain 54 will be updated accordingly, prior to the generation of batched transactions for use in the simulation. Optionally, if the first user's transaction is identified before it is committed to the blockchain, the agent system 30 may verify that the transaction has in fact been committed in a valid block in the blockchain 100 before proceeding with further steps, or in any event prior to the step of overriding wallet state discussed below.

The agent system 30 may also be programmed to automatically engage in purchases or trades of tokens on the first user's behalf without requiring the first user's explicit instruction or authorization in advance. Tokens of interest in that case may be any token in respect of which the agent system 30 invokes a transaction on behalf of the first user. If the agent system 30 serves multiple users, the agent system 30 may maintain records correlating users to tokens of interest.

Once a token of interest has been identified, the agent system 30 monitors the blockchain network for new submitted, uncommitted transactions referencing tokens of interest other than the first user's transaction, and extracts information about those other transactions at 215. When transactions involving any token of interest for any user of the agent system 30 are detected, the simulation method may then proceed in respect of each of these tokens of interest and users. However, for simplicity, the simulation method is described here with reference to a single token of interest and a single user, the first user.

The agent system 30's detection of transactions involving tokens of interest may be carried out in any suitable manner. For example, the agent system 30 may query a node 10 or the simulator node 50 (if the simulator node maintains a pool 56) for transactions awaiting committal that are currently held in the pool (i.e., uncommitted transactions), and filtering the responsive data received from the node 10 for uncommitted transactions relevant to the token of interest, i.e., those that reference the address of the token contract 150 and/or token router contract 160. These transactions awaiting committal will also reference at least one distinct wallet address other than the address of the first user's wallet 140. In the example embodiment discussed here, this may be the wallet associated with the second user 130. The second user's address may be identified as the original submitter of the transaction (in Solidity, the language used to author smart contracts in Ethereum, tx.origin), or may be comprised elsewhere in the transaction, such as an argument of a method specified in the transaction.

The agent system 30 then extracts information for each uncommitted transaction thus identified, including the destination address of the transaction; the address of the originator of the transaction; the data comprised in the transaction (identifying the method to be called in the destination smart contract and its arguments), and the value of the transaction, if any. At 220, this information, together with an additional set of transaction parameters for a hypothetical transaction in which the first user sells their holdings of the token of interest, is then used to define a series of probing transactions to be batched and submitted in a single transaction calling the simulator contract 110. These transactions are referred to as "probing" transactions because they are used to test the outcome should the first user subsequently attempt to sell off their token holdings, after the other transactions found by the agent system 30 are committed to the blockchain.

Thus, for example, in the case where the agent system 30 locates an uncommitted transaction originating from the second user (Bob), a first set of probing transaction parameters is defined with:

<destination address>$_{Bob}$, <data>$_{Bob}$, <proxy address>$_{Bob}$, <value>$_{Bob}$ where <destination address>$_{Bob}$ is an identifier for the destination address specified in the uncommitted transaction (this may be the address of the token contract 150 or token router contract 160); <data>$_{Bob}$ is the method data specified in the uncommitted transaction, identifying the method to be called and any arguments to be passed; <proxy address>$_{Bob}$ is an EOA address referenced in the uncommitted transaction (e.g., the second user's wallet address); and <value>$_{Bob}$ is the transaction fee value specified for the uncommitted transaction.

Additional sets of probing transaction parameters are defined in a similar manner for each additional uncommitted transaction found for the token of interest.

A further probing transaction is defined for the first user for the hypothetical transaction in which the first user sells their holdings, with parameters:

<destination address>$_{Alice}$, <data>$_{Alice}$, <proxy address>$_{Alice}$ where <destination address>$_{Alice}$ is an identifier for a hypothetical destination address (again, the address of the token contract 150 or token router contract 160); <data>$_{Alice}$ specifies the method data for a sale or transfer of the token, including any necessary arguments; and <proxy address>$_{Alice}$ is the address for the first user's wallet 140.

These sets of transaction parameters are arranged in a single batch in series, with the parameters for the uncommitted transaction(s) listed initially, and the parameters for the further hypothetical transaction on behalf of the first user listed as the final transaction in the series (although in some embodiments, additional further probing transactions may be executed following the initial set of probing transactions). Thus, a given batch constructed by the agent system 30 will comprise parameters for at least two transactions with different originating accounts (identified as proxy address).

Figure 6:
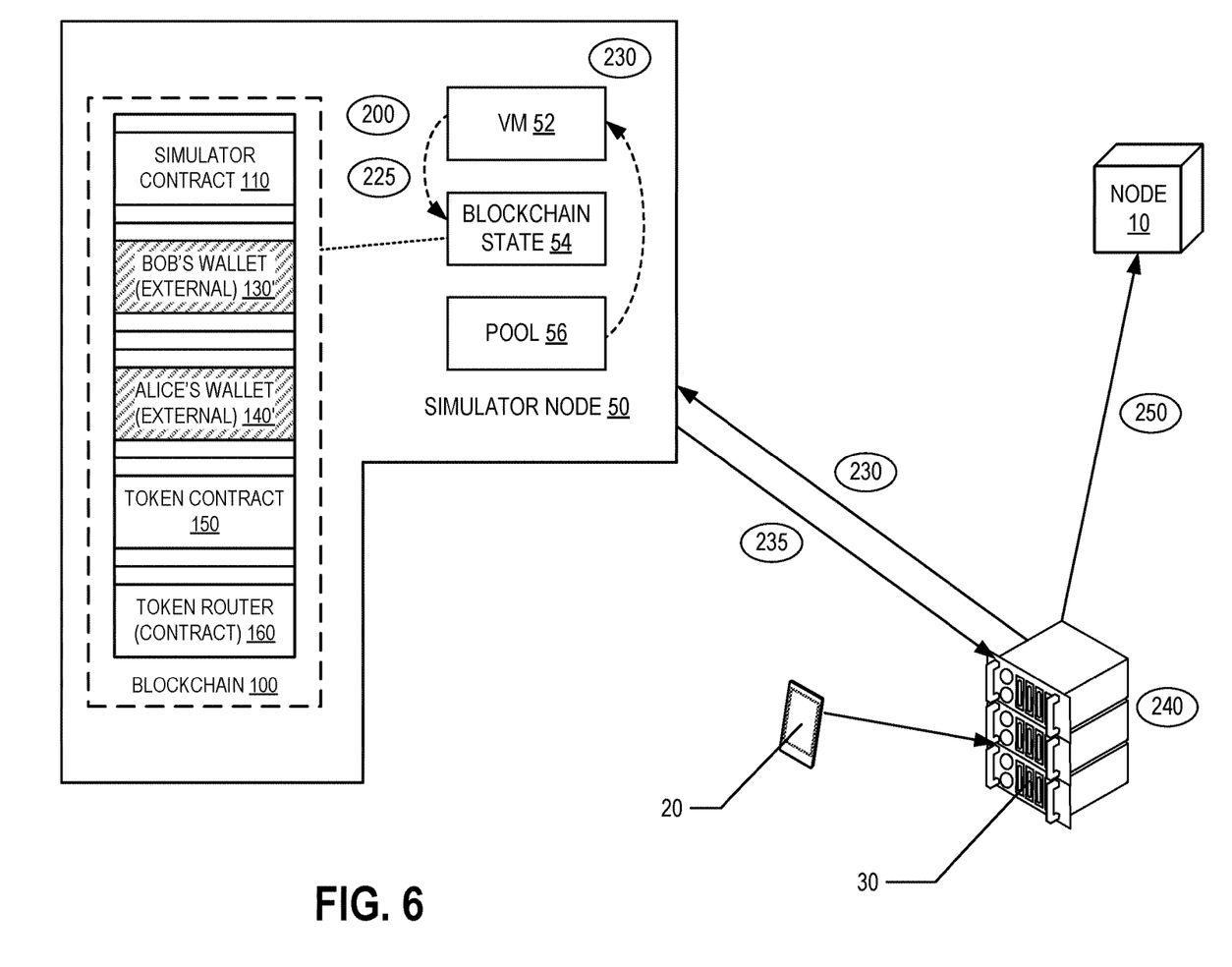
FIG. 6 is a schematic diagram illustrating further steps of the method of FIG. 2 with the blockchain in a second state at the simulator node.

In order to submit this batch of transactions for execution at the simulator node 50, at step 225 the agent system 30 invokes instructions in the simulator node's virtual machine 52 to override the current state of the participating wallets, as identified by each proxy address in the batched transaction parameters (in this example, only wallets 130 and 140) to inject the simulator smart contract bytecode. Referring now to FIGS. 2 and 6, the modified wallets 130' and 140' thus temporarily "appear" to be modified and resemble smart contract accounts, rather than EOAs, for the purpose of executing the batch of transactions.

The simulator smart contract 110 is a smart contract that executes sequences of transactions (i.e., multiple method calls) in a single call to the blockchain, thus enabling the sender to reduce the number of blockchain transactions submitted to the blockchain. The simulation process thus bears some resemblance to known processes for batching transactions such as MultiCall (github.com/joshstevens19/ ethereum-multicall; William Hughes, Alejandro Russo, and Gerardo Schneider. 2021. MultiCall: A Transaction-batching Interpreter for Ethereum. In Proceedings of the 3rd ACM International Symposium on Blockchain and Secure Critical Infrastructure (BSCI '21). Association for Computing Machinery, New York, N.Y., USA, 25-35. DOI: 10.1145/ 3457337.3457839). MultiCall, which was designed to reduce the transaction cost of executing multiple transactions on a blockchain, emulates sequences of transactions in a single transaction, and aggregates their results into a single response message. However, MultiCall cannot be used to accurately simulate the probing transactions constructed by the agent system 30. When Multicall is invoked, a single EOA address is identified as the origin address of the transaction (in Solidity, tx.origin), and the address of the MultiCall smart contract on the blockchain is identified as the immediate account that invokes the method specified by each transaction in the batch (in Solidity, msg.sender). The transactions to be probed at the simulator node 50, however, would ordinarily have different tx.origin and msg.sender values were they actually executed on the blockchain.

Instead, the simulator smart contract 110 is configured at step 230 to call the contract at each proxy address in turn with the parameters associated with that proxy address. If the simulator node is used only for executing probing transactions, the pool 56 may be empty, or contain only other probing transactions; thus, there is unlikely to be any significant delay in executing the probing transactions, enabling the probing transactions to be completed before the uncommitted transactions identified at step 210 are actually committed and added to the blockchain by other nodes 10.

Thus, in the present example, the simulator smart contract 110 calls the smart contracts now present in wallets 130' and 140' with the associated parameters. The smart contract in wallet 130' then calls the method specified in <data>$_{Bob}$ at the address specified in <destination address>$_{Bob}$ to obtain a result indicating success or failure. At the same time, or at about the same time, the smart contract in wallet 140' calls the method specified in <data>$_{Alice}$ at the address specified in <destination address>$_{Alice}$ to obtain a result indicating success or failure. These results are each transmitted to the simulator smart contract 110, which batches the results and transmits them in response to the agent system 30 at 235.

The step of overriding the wallet states at 225 and the invocation of the simulator smart contract 110 at 230 may effectively occur in a single step. For example, this may be accomplished in Ethereum using the eth_call method by including an override parameter. As mentioned above, the simulator smart contract 110 itself may not have been committed to the blockchain 100. The overriding and invocation step may then also include overriding the blockchain state to include the simulator smart contract bytecode.

Figure 4:
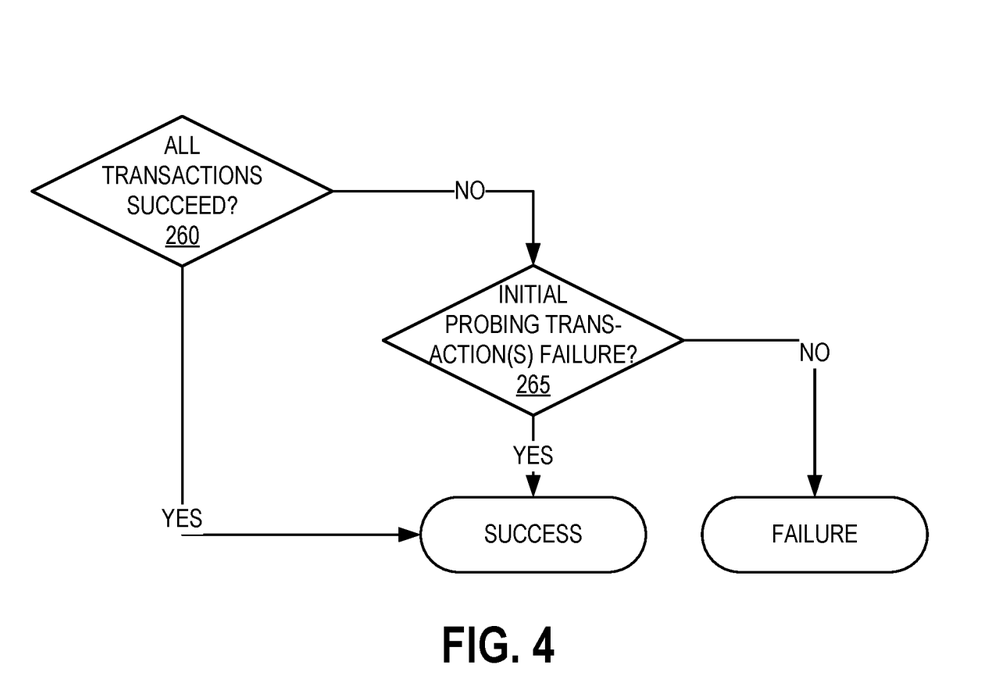

Referring now to FIGS. 3, 4 and 6, the agent system 30 then evaluates the set of results for the series of probing transactions at 240 to determine whether the set of probing transactions succeeded or failed. FIG. 4 illustrates a possible mechanism for assessing the results of the probing transactions. Generally, if the further probing transaction-comprising the first user's hypothetical sale of the token—is determined to be a success, then the probing transactions may be considered a success because the intervening uncommitted transactions submitted by other users to the blockchain will not prevent the first user from selling or transferring their token(s) or share of a token to another party. In many cases, this indicates a low risk that the token offering was not fraudulent. However, even if this further probing transaction is determined to be a failure, the token offering may still be considered low risk if the initial transactions also fail, since failures may be due to benign causes, such as coding errors.

For example, when no error message is returned in response to a probing transaction, the transaction may be determined to be a success. The transaction is determined to be a failure if it is not determined to be a success. As another example, the simulator smart contract 110 may define a threshold value for a successful sale of the token in the further probing transaction. A sale that nets the first user at least 10% (for example) of the value of the token (as determined by the liquidity reserve for the token immediately before) is determined to be a success; otherwise, it is determined to be a failure. Thus, the evaluation may follow the decision tree set out in FIG. 4: if it is determined at 260 all individual probing transactions succeed, then the process evaluates to success; if not, at 265 it is determined whether the initial probing transactions (those involving entities other than the first user) failed and if so, the process also evaluates to success. However, if it is determined at 265 that the initial probing transactions did not fail, then the process evaluates to a failure.

Returning to FIG. 3, if the results are determined to indicate a successful transaction, then no further action may be needed, and at 245 the process ends. However, if the results indicate a failure, then a responsive action may be undertaken at 250. The responsive action may be any suitable action to minimize the loss expected for the first user, such as a sale of the first user's token holdings with a higher transaction fee than the uncommitted transactions found at step 210. In that case, at 250, the agent system 30 sends this new transaction on behalf of the first user to a node 10 of the blockchain network.

The determination whether the further probing transaction comprising the sale of the user's token is a success or failure may be defined in logic executed at the agent computing system 30 as described above, or alternatively in logic executed within the simulator smart contract 110. In the latter case, the results of the probing transaction are obtained by the simulator smart contract 110 at 235, and the simulator smart contract 110 also executes any logic to evaluate success or failure at 240, such as the logic illustrated in FIG. 4. The output of the simulator smart contract 110 to the agent computing system 30 may be a signal indicating whether the further probing transaction is determined to be a success or a failure, so that the agent computing system 30 can then execute any responsive action 250.

In the example above, the evaluation of the probing transactions as a success is based on the successful hypothetical sale of the token on behalf of the user. However, in the simulation other factors may also be assessed to determine whether the transaction is a success or failure, and whether a responsive action should be taken. For example, the simulator smart contract 110 may execute a function to check the tax deducted (i.e., a fee deducted for every token transaction, and sent to an address designated by the token contract or token router contract) after the further probing transaction to sell the token; since the tax depletes the value received by the hypothetical sale of the token, the transaction may be evaluated as a failure at 240 if the tax is higher than a threshold value, even when the hypothetical sale transaction is successful. As another example, the price of the token following the execution of the initial probing transactions may be checked. If the price falls lower than a threshold value, then the transaction may be evaluated as a failure at 240. In a further example, following execution of the initial probing transactions, the supply of available tokens is checked; if there is an increase in the amount of tokens available beyond a defined threshold, indicating that a number of tokens was minted (thereby decreasing potential value of the user's token), this may result in an evaluation as a failure at 240. The token price or number of available tokens may be evaluated in the simulation without executing the hypothetical sale of the token on behalf of the user.

The transactions assessing these other factors may be executed in combination with the initial and further probing transactions described above, or separately at or around the same time as those initial and further probing transactions. The simulator node 50 may execute a plurality of simulations—two, three, or more simulations—in respect of the original token purchase by the user: for example, a first simulation as described above, in which the further probing transaction is the hypothetical sale of the token; a second simulation that checks the price of the token after the initial probing transactions; and a third simulation that checks the tax on token transactions. The transaction may be evaluated as a success if all individual simulations are determined to be a success. Alternatively, the transaction may be evaluated as a success if at least a certain number of individual simulations are determined to be a success.

When the responsive action is taken at 250, those skilled in the art will understand that the order of execution of uncommitted transactions in the blockchain pool is not guaranteed, but is generally determined by incentivizing factors. For example, in a blockchain employing a proof-of-work consensus such as earlier versions of Ethereum, a portion of the transaction fee (commonly referred to as "gas") may be payable to the miner as an incentive to mine the transaction and add it to the blockchain. For example, the sender of a transaction specifies a gas price accompanying the transaction, which must be equal to or greater than the base gas price (or "reserve price") for the block to be added to the blockchain; the value of the gas price in excess of the base gas price (the "gas fee") is paid to the miner. Similarly, in a blockchain implementing a proof-of-stake consensus, the gas fee is paid to the validator. The appropriate gas price, and thus gas fee, may depend on the relative size of the pool of uncommitted transactions, or other factors that may be assessed by the agent system 30 when sending the responsive transaction to the node 10. In some blockchain networks, other incentives may be used to accelerate the addition of the responsive transaction to the blockchain. For example, block builders may offer to prioritize a transaction ahead of other transactions in the pool in exchange for a fee.

Further, in another embodiment, if the first user's initial transaction to acquire the token is detected before it is committed, and other related, uncommitted transactions by other entities can be found in the pool and tested through probing transactions at the simulator node 50 before first user's initial transaction is committed, the possible responsive action at 250 may be a cancellation of the initial transaction by sending a replacement transaction with the same nonce and a higher transaction fee, so that validators will be incentivized to mine the replacement transaction and add it to the blockchain in place of the initial transaction. In such a scenario, the series of probing transactions must include, as the first probing transaction, the first user's initial purchase transaction since that initial purchase will not be reflected in the current state of the blockchain 100.

Under typical blockchain network conditions (i.e., the typical speed at which transactions are committed to the blockchain), it has been found that the above simulation process and responsive action can be completed within average time required for an uncommitted transaction to be added to a new block in the blockchain. As of early 2023, the typical block time slot on Ethereum is about 12-15 seconds, and the BNB Chain™ (sometimes referred to as the Binance® Smart Chain, approximately 3 seconds.

The examples and embodiments above are presented only by way of example and are not meant to limit the scope of the subject matter described herein. Variations of these examples and embodiments will be apparent to those in the art and are considered to be within the scope of the subject matter described herein. For example, some steps or acts in a process or method may be reordered or omitted, and features and aspects described in respect of one embodiment may be incorporated into other described embodiments. As another example, while the embodiments described above contemplate the use of an agent system 30, it will be understood by those skilled in the art that the functionality of the agent system 30 may be collocated or integrated with the simulator node 50, or alternatively with the user device 20, or the functions of the agent system 30, user device 20, and simulator node 50 may be carried out at a single device or computer system.

Accordingly, there is provided a method for simulating multi-user transactions, comprising: identifying a first transaction submitted to a blockchain by or on behalf of a first user associated with a wallet on the blockchain at a first user account address, the first transaction comprising a purchase of at least a share of a token, the first transaction having been committed to the blockchain or awaiting committal to the blockchain; retrieving information about at least one other transaction awaiting committal to the blockchain for the blockchain referencing the at least the share of the token, each of the at least one other transaction referencing an other wallet on the blockchain associated with a corresponding other user; at a specified node of the blockchain, overriding a state of the user's wallet and of each other wallet to contain code executable to aggregate multiple transactions into a single call and submitting executing a plurality of probing transactions to the specified node in a single call, the plurality of probing transactions comprising: a set of one or more initial probing transactions comprising: an initial a probing transaction corresponding to each other transaction of the at least one other transaction, the probing transaction comprising: a destination address identifier specified in the queued transaction; identification of a method and corresponding method arguments for the other transaction; a proxy address comprising an address of the other wallet referenced by the other transaction; and a value specified by the other transaction; and following the set of one or more initial probing transactions, a final further probing transaction comprising a sale of the at least the share of the token by the first user, the final further probing transaction comprising: a destination address identifier; identification of a method and corresponding method arguments for the final further probing transaction; and a proxy address comprising the first user account address; such that each probing transaction of the plurality of probing transactions is executed by the code contained in the wallet corresponding to the proxy address comprised in the probing transaction, in accordance with the state of the wallet as overridden; obtaining results for the plurality of probing transactions; and selectively initiating a responsive action on the blockchain based on the results.

In one aspect, the remedial responsive action comprises selling the at least the share of the token on behalf of the first user.

In another aspect, the responsive remedial action is initiated when the initial probing transactions succeed and the final further probing transaction fails.

In a further aspect, the first transaction is committed to the blockchain prior to detecting the first transaction.

In another aspect, committal of the first transaction to the blockchain is verified prior to executing the responsive remedial action.

In still another aspect, identifying the first transaction comprises: querying a queue of the blockchain for queued transactions relating to the at least the share of the token.

In another aspect, the plurality of probing transactions comprise at least one additional further probing transaction comprising one or more of: a price check for the token or the at least the share of a token; a determination of tax charged for a sale of the token or the at least the share of a token; or a check to determine whether additional tokens have been minted.

In yet another aspect, the method further comprises, after overriding the state of the user's wallet and of each other wallet: submitting a further plurality of probing transactions to the specified node in a single call, the further plurality of probing transactions comprising: the set of one or more initial probing transactions; and following the set of one or more initial probing transactions, a further probing transaction comprising one or more of: a price check for the token or the at least the share of a token; a determination of tax charged for a sale of the token or the at least the share of the token; or a check to determine whether additional tokens have been minted; and obtaining results for the further plurality of probing transactions.

In still a further aspect, selectively initiating a responsive action on the blockchain based on the results comprises selectively initiating the responsive action based on the results of the plurality of probing transactions and the further plurality of probing transactions.

There is also provided computer-readable media, which may be stored and/or executed on one or more computer systems to implement the foregoing methods and aspects.

There is also provided a computer system that is capable of operating as a node in a blockchain network comprising at least one processor, memory, storage device(s), and communication system(s) configured to implement some or all of the foregoing method. Functionality may be distributed over a plurality of systems, such as a blockchain node computer system and an agent computer system, or executed at a single location or system.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

The invention claimed is:

1. A method for simulating multi-user transactions, comprising:
   identifying a first transaction submitted to a blockchain by or on behalf of a first user associated with a wallet on the blockchain at a first user account address,
      the first transaction comprising a purchase of at least a share of a token, the first transaction having been committed to the blockchain or awaiting committal to the blockchain;
   retrieving information about at least one other transaction awaiting committal to the blockchain for the blockchain referencing the at least the share of the token, each of the at least one other transaction referencing an other wallet on the blockchain associated with a corresponding other user;
   at a specified node of the blockchain, overriding a state of the first user's wallet and of each other wallet to contain code executable to aggregate multiple transactions into a single call and executing a plurality of probing transactions to the specified node in a single call, the plurality of probing transactions comprising:
      a set of one or more initial probing transactions comprising:
         a probing transaction corresponding to each other transaction of the at least one other transaction, the probing transaction comprising:
            a destination address identifier specified in said other transaction of the at least one other transaction;
            identification of a method and corresponding method arguments for the other transaction;
            a proxy address comprising an address of the other wallet referenced by the other transaction; and
            a value specified by the other transaction; and
         following the set of one or more initial probing transactions,
            a further probing transaction comprising a sale of the at least the share of the token by the first user, the further probing transaction comprising:
               a destination address identifier;
               identification of a method and corresponding method arguments for the further probing transaction; and
               a proxy address comprising the first user account address;
      such that each probing transaction of the plurality of probing transactions is executed by the code contained in the wallet corresponding to the proxy address comprised in the probing transaction, in accordance with the state of the wallet as overridden;
   obtaining results for the plurality of probing transactions; and
   selectively initiating a responsive action on the blockchain based on the results.

2. The method of claim 1, wherein the responsive action comprises selling the at least the share of the token on behalf of the first user.

3. The method of claim 2, wherein the responsive action is initiated when the initial probing transactions succeed and the further probing transaction fails.

4. The method of claim 1, wherein the first transaction is committed to the blockchain prior to detecting the first transaction.

5. The method of claim 1, further comprising verifying that the first transaction was committed to the blockchain prior to executing the responsive action.

6. The method of claim 1, wherein identifying the first transaction comprises:
   querying a queue of the blockchain for queued transactions relating to the at least the share of the token.

7. The method of claim 1, wherein the plurality of probing transactions comprise at least one additional further probing transaction comprising one or more of:
   a price check for the token or the at least the share of a token;
   a determination of tax charged for a sale of the token or the at least the share of a token; or
   a check to determine whether additional tokens have been minted.

8. The method of claim 1, further comprising, after overriding the state of the first user's wallet and of each other wallet:
   submitting a further plurality of probing transactions to the specified node in a single call, the further plurality of probing transactions comprising:
      the set of one or more initial probing transactions; and
      following the set of one or more initial probing transactions,
         a further probing transaction comprising one or more of:
            a price check for the token or the at least the share of a token;
            a determination of tax charged for a sale of the token or the at least the share of the token; or
            a check to determine whether additional tokens have been minted; and
   obtaining results for the further plurality of probing transactions.

9. The method of claim 8, wherein selectively initiating a responsive action on the blockchain based on the results comprises selectively initiating the responsive action based on the results of the plurality of probing transactions and the further plurality of probing transactions.

10. Non-transitory computer-readable media comprising code which, when executed by one or more processors of one or more computer systems, causes the one or more computer systems to implement:
   identifying a first transaction submitted to a blockchain by or on behalf of a first user associated with a wallet on the blockchain at a first user account address,
      the first transaction comprising a purchase of at least a share of a token, the first transaction having been committed to the blockchain or awaiting committal to the blockchain;
   retrieving information about at least one other transaction awaiting committal to the blockchain for the blockchain referencing the at least the share of the token, each of the at least one other transaction referencing an other wallet on the blockchain associated with a corresponding other user;

at a specified node of the blockchain, overriding a state of the first user's wallet and of each other wallet to contain code executable to aggregate multiple transactions into a single call and executing a plurality of probing transactions to the specified node in a single call, the plurality of probing transactions comprising:

a set of one or more initial probing transactions comprising:

a probing transaction corresponding to each other transaction of the at least one other transaction, the probing transaction comprising:

a destination address identifier specified in said other transaction of the at least one other transaction;

identification of a method and corresponding method arguments for the other transaction;

a proxy address comprising an address of the other wallet referenced by the other transaction; and a value specified by the other transaction; and following the set of one or more initial probing transactions, a further probing transaction comprising a sale of the at least the share of the token by the first user, the further probing transaction comprising:

a destination address identifier;

identification of a method and corresponding method arguments for the further probing transaction; and a proxy address comprising the first user account address;

such that each probing transaction of the plurality of probing transactions is executed by the code contained in the wallet corresponding to the proxy address comprised in the probing transaction, in accordance with the state of the wallet as overridden;

obtaining results for the plurality of probing transactions; and selectively initiating a responsive action on the blockchain based on the results.

11. The non-transitory computer-readable media of claim 10, wherein the responsive action comprises selling the at least the share of the token on behalf of the first user.

12. The non-transitory computer-readable media of claim 11, wherein the responsive action is initiated when the initial probing transactions succeed and the further probing transaction fails.

13. The non-transitory computer-readable media of claim 10, wherein the first transaction is committed to the blockchain prior to detecting the first transaction.

14. The non-transitory computer-readable media of claim 10, further comprising verifying that the first transaction was committed to the blockchain prior to executing the responsive action.

15. The non-transitory computer-readable media of claim 10, wherein identifying the first transaction comprises:

querying a queue of the blockchain for queued transactions relating to the at least the share of the token.

16. The non-transitory computer-readable media of claim 10, wherein the plurality of probing transactions comprise at least one additional further probing transaction comprising one or more of:

a price check for the token or the at least the share of a token;

a determination of tax charged for a sale of the token or the at least the share of a token; or a check to determine whether additional tokens have been minted.

17. The non-transitory computer-readable media of claim 10, further comprising, after overriding the state of the first user's wallet and of each other wallet:

submitting a further plurality of probing transactions to the specified node in a single call, the further plurality of probing transactions comprising:

the set of one or more initial probing transactions; and following the set of one or more initial probing transactions, a further probing transaction comprising one or more of:

a price check for the token or the at least the share of a token;

a determination of tax charged for a sale of the token or the at least the share of the token; or a check to determine whether additional tokens have been minted; and obtaining results for the further plurality of probing transactions.

18. The non-transitory computer-readable media of claim 17, wherein selectively initiating a responsive action on the blockchain based on the results comprises selectively initiating the responsive action based on the results of the plurality of probing transactions and the further plurality of probing transactions.

19. A computing system configured to operate as a node of a blockchain network, the computing system comprising:

at least one processor;

memory;

at least one storage device; and at least one communications system, the at least one processor being configured to:

receiving, over the at least one communications system, information about a plurality of transactions relating to a blockchain of the blockchain network, the plurality of transactions comprising:

a first transaction submitted to the blockchain by or on behalf of a first user associated with a wallet on the blockchain at a first user account address, the first transaction comprising a purchase of at least a share of a token, the first transaction having been committed to the blockchain or awaiting committal to the blockchain;

at least one other transaction awaiting committal to the blockchain for the blockchain referencing the at least the share of the token, each of the at least one other transaction referencing an other wallet on the blockchain associated with a corresponding other user;

at the computing system, overriding a state of the first user's wallet and of each other wallet to contain code executable to aggregate multiple transactions into a single call and submitting a plurality of probing transactions, the plurality of probing transactions comprising:

a set of one or more initial probing transactions comprising:

a probing transaction corresponding to each other transaction of the at least one other transaction, the probing transaction comprising:

a destination address identifier specified in said other transaction of the at least one other transaction;

identification of a method and corresponding method arguments for the other transaction;
a proxy address comprising an address of the other wallet referenced by the other transaction; and
a value specified by the other transaction; and
following the set of one or more initial probing transactions,
a further probing transaction comprising a sale of the at least the share of the token by the first user, the further probing transaction comprising:
a destination address identifier;
identification of a method and corresponding method arguments for the further probing transaction; and
a proxy address comprising the first user account address;
such that each probing transaction of the plurality of probing transactions is executed by the code contained in the wallet corresponding to the proxy address comprised in the probing transaction, in accordance with the state of the wallet as overridden; and
obtaining results for the plurality of probing transactions.

20. The computer system of claim 19, wherein the at least one processor is further configured to:
transmit the results for the plurality of probing transactions to an agent computer system.

21. The computer system of claim 20, further comprising the agent computer system, wherein the agent computer system is configured to selectively initiate a responsive action on the blockchain based on the results.

22. The computer system of claim 20, wherein the at least one processor is configured to receive information about the plurality of transactions from the agent computer system.

23. The computer system of claim 19, wherein the plurality of probing transactions comprise at least one additional further probing transaction comprising one or more of:
a price check for the token or the at least the share of a token;
a determination of tax charged for a sale of the token or the at least the share of a token; or
a check to determine whether additional tokens have been minted.

24. The computer system of claim 23, further comprising, after overriding the state of the first user's wallet and of each other wallet:
submitting a further plurality of probing transactions to the specified node in a single call, the further plurality of probing transactions comprising:
the set of one or more initial probing transactions; and
following the set of one or more initial probing transactions,
a further probing transaction comprising one or more of:
a price check for the token or the at least the share of a token;
a determination of tax charged for a sale of the token or the at least the share of the token; or
a check to determine whether additional tokens have been minted; and
obtaining results for the further plurality of probing transactions.

* * * * *